United States Patent [19]
Weigand

[11] Patent Number: 5,117,441
[45] Date of Patent: May 26, 1992

[54] METHOD AND APPARATUS FOR REAL-TIME DEMODULATION OF A GMSK SIGNAL BY A NON-COHERENT RECEIVER

[75] Inventor: David L. Weigand, Schaumburg, Ill.

[73] Assignee: Motorola, Inc., Schaumburg, Ill.

[21] Appl. No.: 660,372

[22] Filed: Feb. 25, 1991

[51] Int. Cl.[5] .................................. H04L 27/10
[52] U.S. Cl. ................................ 375/90; 375/45; 375/47; 329/300
[58] Field of Search .............. 375/47, 45, 90, 80, 375/82; 329/300, 302

[56] References Cited

U.S. PATENT DOCUMENTS

| | | | |
|---|---|---|---|
| 4,656,648 | 4/1987 | Vallet | 375/90 X |
| 4,669,095 | 5/1987 | Hall | 375/90 |
| 5,048,058 | 9/1991 | Kaleh | 375/47 |

FOREIGN PATENT DOCUMENTS

89/04095  5/1989  World Int. Prop. O. ............ 375/90

OTHER PUBLICATIONS

IEE Vehicular Technology, vol. VT-33, No. 3, Aug. 1984, Generalized Tamed Frequency Modulation and its Application for Mobile Radio Communications.
IEEE Vehicular Technology, vol. VT-33, No. 3, Aug. 1984, Multilevel Decision Method for Band-Limited Digital FM with Limiter-Discriminator Detection.

Primary Examiner—Benedict V. Safourek
Assistant Examiner—T. Ghebretinsae
Attorney, Agent, or Firm—Kenneth W. Bolvin

[57] ABSTRACT

The GMSK real-time demodulation apparatus and process of the present invention demodulates a coherent quadrature phase modulated GMSK signal in real-time using a non-coherent receiver. The GMSK signal is initially non-coherent detected, thus producing a channel symbol signal. This signal is then differentially decoded to recover the encoded digital information.

5 Claims, 5 Drawing Sheets

$X_n = Y_n \oplus X_{n-1}$

_5,117,441_

METHOD AND APPARATUS FOR REAL-TIME DEMODULATION OF A GMSK SIGNAL BY A NON-COHERENT RECEIVER

FIELD OF THE INVENTION

The present invention relates generally to the field of communications and particularly to real-time demodulation of a gaussian minimal shift keying (GMSK) signal.

BACKGROUND OF THE INVENTION

Increased demand for digitally encoded speech and data services in cellular radio communications has resulted in a more efficient use of the spectrum through the development of a number of new digital modulation techniques for use over mobile radio channels. Several of these spectrally efficient modulation techniques use coherent quadrature modulation that can achieve greater than one bit per hertz efficiency.

This is the case in Group Speciale Mobile (GSM), the TDMA digital cellular radiotelephone standard being implemented in Europe. GSM uses gaussian minimal shift keying (GMSK) type modulation for the transmission of radiotelephone signals. The format of the data that is transmitted is illustrated in FIG. 3. The digitally sampled speech information (301 and 302) is located on both sides of a 26 bit training sequence or midamble (303). The training sequence is used by the radiotelephone receiving the signal to synchronize the radiotelephone in time with the signal. There are typically eight possible training sequences that can be used, each mobile radiotelephone having all eight received patterns stored in memory. The radiotelephone knows which training sequence to use by the base station color code (BCC) provided by the base.

Since GSM is a TDMA architecture communication system, it is time-slot oriented with eight time-slots per TDMA frame. The known active receive time-slot in a radiotelephone controls an $R_{xAcq}$ signal that is asserted high during the time-slot data is to be received. The $R_{xAcq}$ signal has a ⅛ duty cycle.

A typical transmitter apparatus used in a GMSK-type cellular radiotelephone system is illustrated in FIG. 4. The digitized speech symbols are first differentially encoded (401) yielding logic symbols ($\delta_i$) before it is algebraically mapped (402) generating channel symbols ($a_i$). The algebraic mapping is as follows:

$$0 \rightarrow +1 \rightarrow +\Delta f$$

$$1 \rightarrow -1 \rightarrow -\Delta f$$

where $\pm \Delta f$ is the change in frequency of the received signal.

These channel symbols are then GMSK modulated (403), which is best modeled as a gaussian low-pass filter followed by a voltage controlled oscillator, and mixed to the carrier freqency (404) before transmission. The transmit physical layer is further described in GSM Recommendation 05.04 Version 3.1.1, published January 1990.

The GMSK coherent quadrature phase modulation technique used presents significant problems due to the prohibitive costs and implementation complexity of a coherent quadrature phase receiver. There is a resulting need for a relatively low cost GMSK demodulator that allows the real-time reception and demodulation of a GMSK coherent quadrature phase modulated signal.

SUMMARY OF THE INVENTION

The GMSK real-time demodulation apparatus and process of the present invention demodulates a coherent quadrature phase modulated GMSK signal in real-time using a non-coherent receiver. The GMSK signal is initially non-coherently detected, thus producing a channel symbol signal. This signal is then differentially decoded to recover the encoded digital information.

DETAILED DESCRIPTION OF THE PREFERRED EMBODIMENT

The process and apparatus of the present invention demodulates a coherent quadrature GMSK signal in real-time using a non-coherent receiver. This enables the receiver of a digital radiotelephone to be more cost effective and greatly reduces implementation complexity over currently used relatively expensive coherent receivers.

Figure 1:
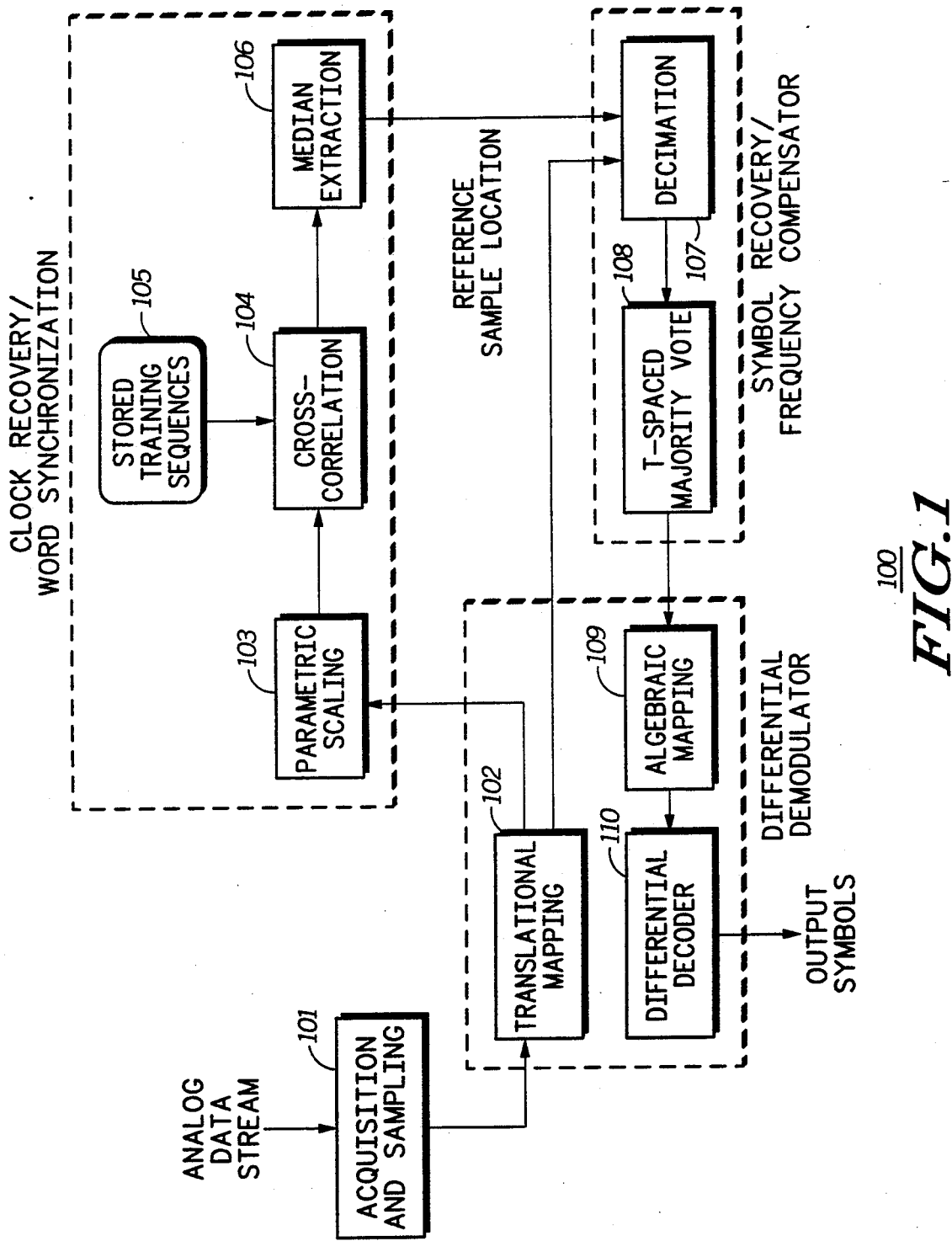
FIG. 1 shows a block diagram of the process of the present invention.

The process of the present invention, illustrated in FIG. 1, detects the $\Delta \phi_i$ term of the differential demodulation equation, $\phi_i = \phi_{i-1} + \Delta \phi_i$, instead of the $\phi_i$ term that is detected by coherent quadrature demodulation techniques. The differential demodulation process examines each symbol's phase contribution separately as mapped to the frequency domain.

Figure 2:
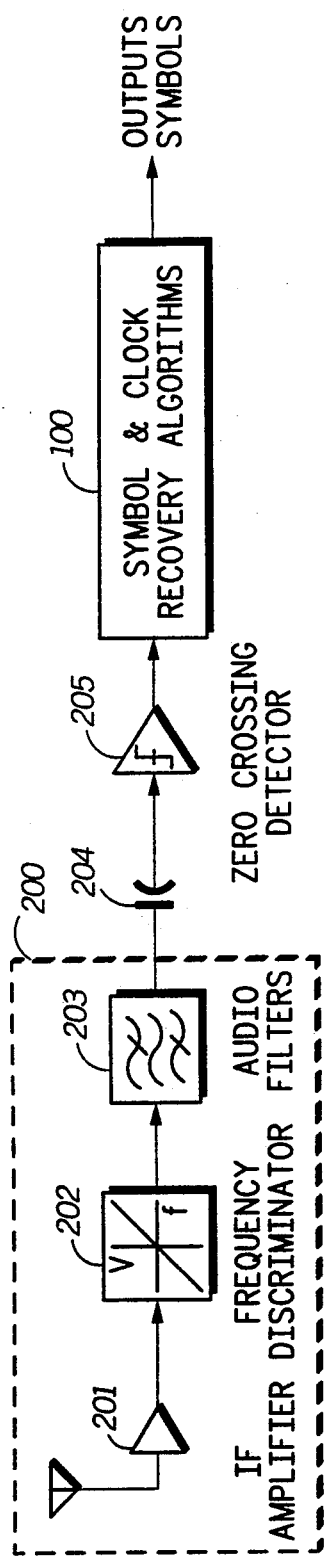
FIG. 2 shows a block diagram of a non-coherent FM receiver in accordance with the present invention.
Figure 3:
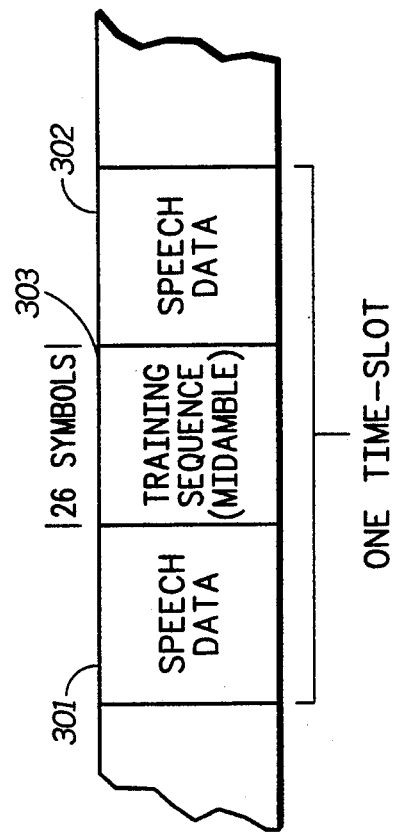
FIG. 3 shows the format of data transmitted in one time-slot of a GMSK-type cellular radiotelephone system.
Figure 4:
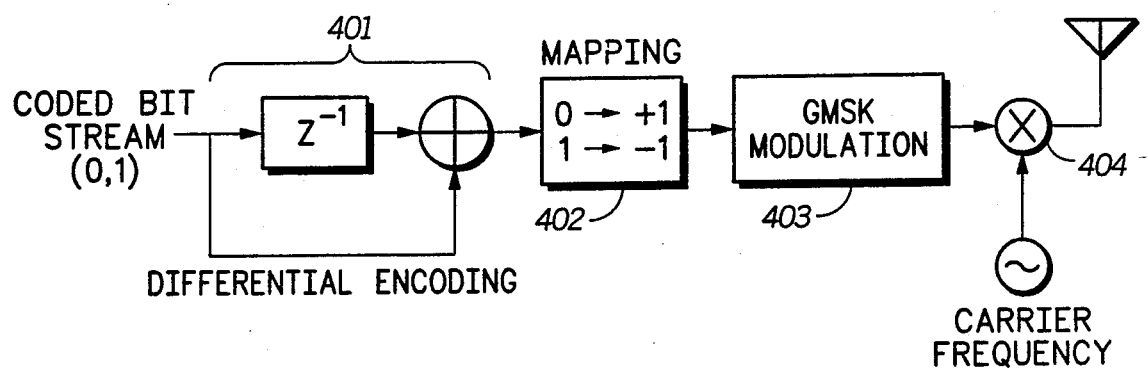
FIG. 4 shows a block diagram of a typical coherent transmitter used in a GMSK-type cellular radiotelephone system.
Figure 7:
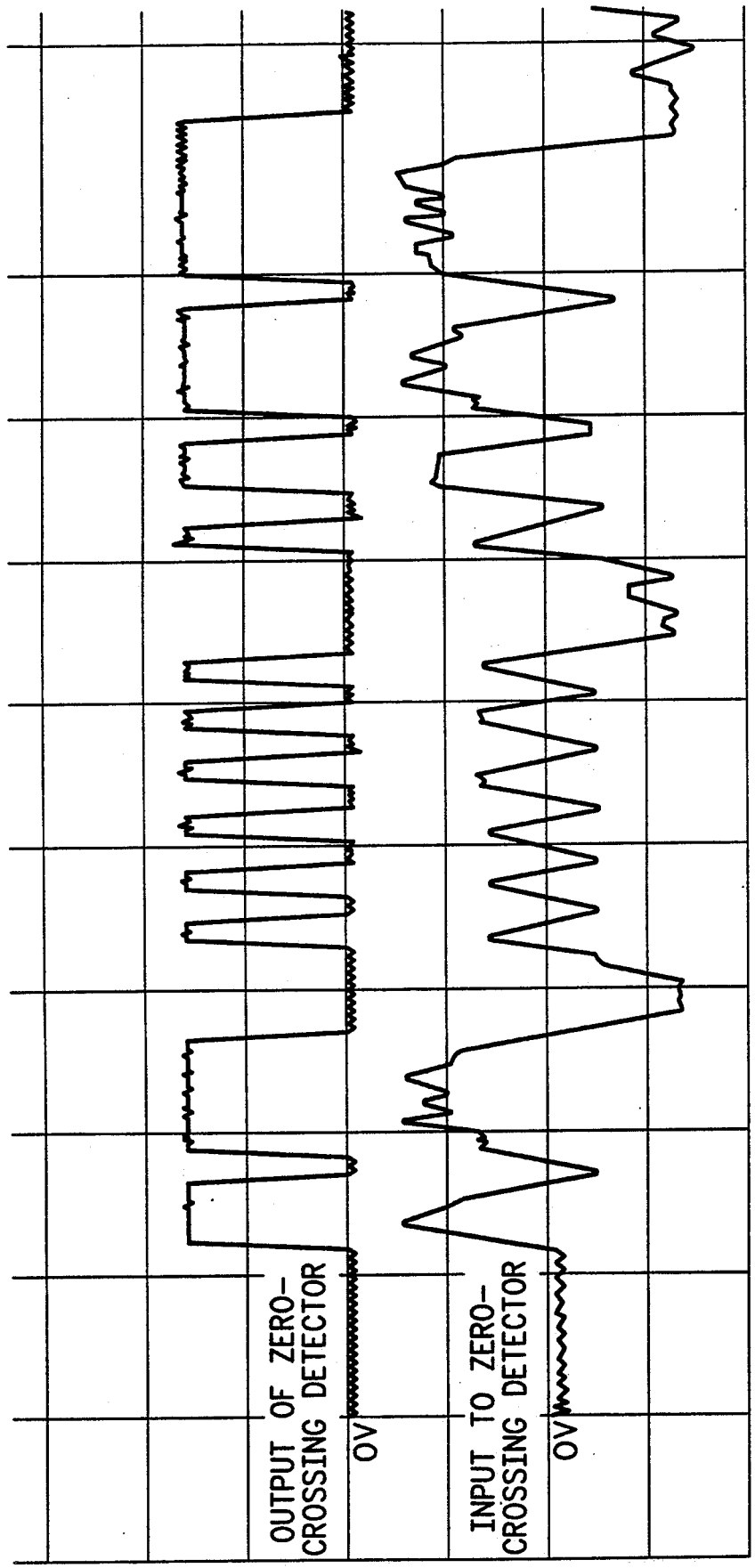
FIG. 7 shows the input and output of the zero crossing detector of the present invention.

Before the process of the present invention is performed, the received signal is processed by a typical non-coherent FM, frequency discriminator based receiver. A block diagram of this apparatus, in conjunction with the process of the present invention, is illustrated in FIG. 2. The signal is amplified (201) before the frequency discriminator (202) converts the frequency of the signal to the corresponding voltage. The resulting signal is filtered (203) before a coupling capacitor (204) couples the FM receiver (200) to a zero-crossing detector (205). The zero-crossing detector (205), essentially a one bit A/D converter generating hard samples, converts and limits a positive voltage input to +5 V (logic 1) and a negative voltage input to 0 V (logic 0). This operation is illustrated in FIG. 7. Due to the limiting effect, the zero-crossing detector (205) acts as a gain compensator. In the preferred embodiment of the present invention, the logic level signal is then input to a digital signal processor (DSP) containing the process of the present invention.

The logic level signal is sampled (101) by the DSP at a 4X oversample rate and gated by $R_{xAcq}$. It is necessary to oversample the symbols since there is no synchronous clock provided. In the preferred embodiment, the logic signal has a frequency of 270.833 kHz. The FM output signal, therefore, is sampled at a rate of 1.0833 MHz. Referring to FIG. 1, the process of the present invention first performs a translational mapping (102) of the hard-decision, oversampled logic signal to other representative symbols of −1 for a logic 0 and +1 for a logic 1. This mapping function is required in order to reconstruct the differentially encoded, algebraically mapped received signal that was altered by the FM receiver. The mapping allows correct cross-correlation of the signal.

The process of the present invention next performs a parametric scaling (103) function. To insure unsaturated cross-correlations and to minimize dynamic range problems, these sampled data values are scaled by a factor of sixteen before the cross-correlation process.

After the scaling function (103), the oversampled symbols are cross-correlated (104) with one of the eight 26 bit training patterns stored (105) in the receiver of the present invention. These training patterns in the receiver are stored differentially encoded, scaled and algebraically mapped for proper correlation. The cross-correlation operation (104) recovers the clock from the signal and synchronizes the radiotelephone with the signal in the time domain. The synchronization is required due to the variable propagation delay from the time the signal is transmitted to the time the radiotelephone actually receives the signal. By the time the signal is received by the radiotelephone, the time-slot to be used by the radiotelephone and the $R_{xAcq}$ signal are shifted in time. As specified by GSM, the propagation delay of the channel must not exceed ±5 bit times ±(5 T).

The cross-correlation function (104) moves the training sequence x(n) across the sampled data y(n) at an oversampled (4X) rate due to the data signal being a 4X oversampled signal. The cross-correlation is illustrated as:

$$r_{xy}(\beta) = \sum_{n=-\infty}^{\infty} x(n)y(n - \beta)$$

$$\beta = 0, \ldots, \pm 5k$$

At this oversample rate, there are four times as many bits in one T-space as normal, guarantying the time domain synchronization to be within ⅛ of a symbol period. The T-spaced cross-correlation function produces a sequence of numbers of which the peak and its associated reference location in the data stream are stored. It is at these peak positions where the stored training sequence matches the mapped data signal best. This correlation peak will be very close to one, due to scaling. Since the data signal sampled was hard-decision, the discrete correlation will yield several peaks of the same value and different but contiguous locations, as determined by the oversample rate. In the preferred embodiment of the present invention, the maximum number of peaks will be four but nominally three due to signal transition periods.

A median extraction function (106) is required to complete the clock recovery process and allow for the correct sample extraction per symbol period. In this function, the middle most peak sample (nominally median of three) is chosen to represent the maximum eye opening in the symbol period. Once this sample is chosen the corresponding symbol has been determined and its location becomes the reference sample location. Once this symbol is chosen, the process of the present invention has recovered the clock and is fully synchronized in the time domain.

A decimation function (107) then takes every fourth sample relative to the reference sample location and marks it as the primary sample for its symbol period.

Due to Rayleigh fading, Doppler shift, and crystal instability, the frequency of the received signal may be offset from the nominal. The next function of the process of the present invention compensates the offset frequency by performing a T-spaced weighted majority vote (108). This function is not required if the frequency offset is negligible relative to a T/2 period, since the frequency offset is inducing a minimal sliding between the sample clock and the data clock. In this function, if the three surrounding samples are different from the primary sample, the decision threshold is exceeded and the value of the three samples is assigned to the symbol. Additionally, the location of the center sample of the three is now used as the updated reference sample location. All further decimation is performed off this reference location. This function allows a frequency offset to be successfully tracked, thereby avoiding the washbowl effect of symbol recovery errors. Once all of the symbols have been chosen, the process of the present invention is synchronized in both time and frequency domains to the received signal.

The synchronized signal must now be algebraically mapped (109). The following defined function:

$$\delta_i = (1 - \alpha_i)/2$$

where ($\delta_i$ {0, 1}); and ($\alpha_i$ {−1, +1})

maps the channel symbols ($\alpha_i$) to the logic symbols ($\delta_i$). An algebraic mapping of this kind uses an implicit decision threshold of zero. This function reverses the mapping used in the modulation process.

Figure 5:
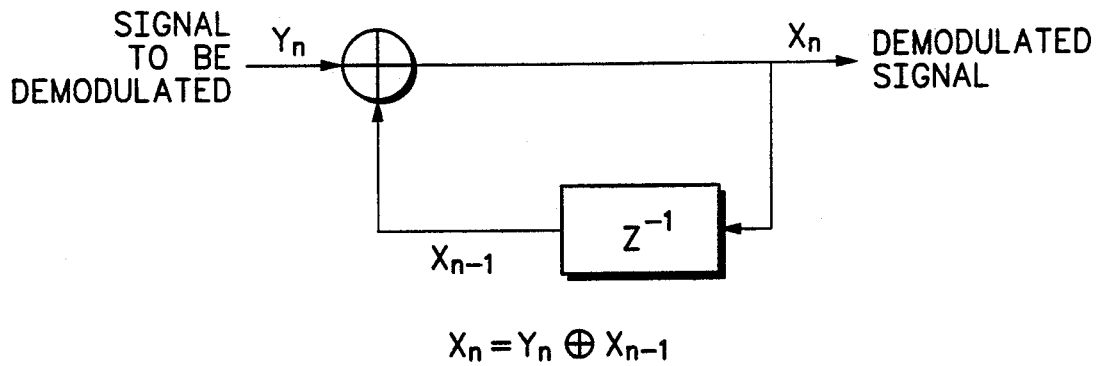
FIG. 5 shows a method for implementing a differential decoder in accordance with the process of the present invention.
Figure 6:
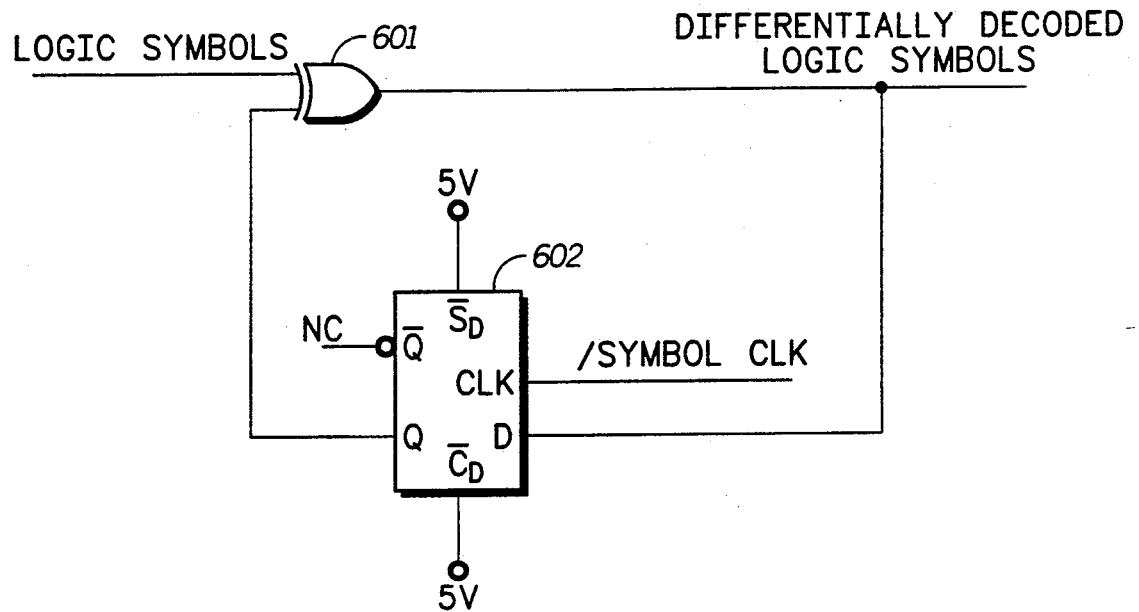
FIG. 6 shows a hardware differential decoder circuit.

The final function of the process of the present invention is differential decoding (110) of the synchronous signal. Differentially decoding reverses the inherent integration process done by GMSK modulation before transmission of the signal by separately examining each symbols phase contribution. The differential decoding function is essentially an integrator of the logical symbols, producing the original symbol stream that was modulated and transmitted to the receiver of the present invention. This differential decoding function, illustrated in FIG. 5, is accomplished by XORing $y_n$, the input synchronous signal, with $x_{n-1}$, the delayed feedback signal.

Figure 8:
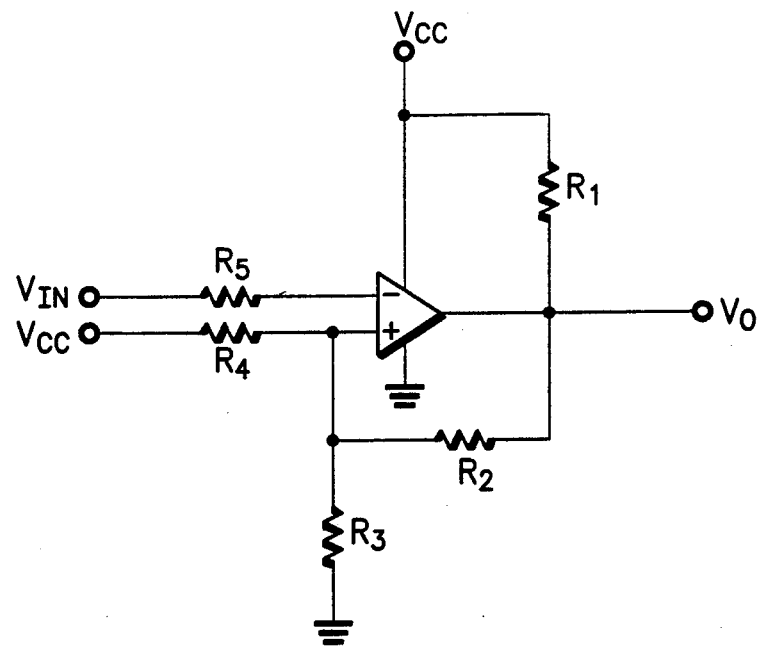
FIG. 8 shows a inverting threshold comparator circuit.

An alternate embodiment of the present invention can be implemented in hardware, each step of the process being implemented in hardware. GMSK demodulation is known in the art as illustrated in IEEE Transactions on Vehicular Technology, Vol. VT-33, No. 3, August 1984, *Multilevel Decision Method for Band-Limited Digital FM with Limiter-Discriminator Detection* by M. Hirono, T. Miki, and K. Murota. Hardware implementation of the GMSK demodulator is accomplished through a hardware correlator, RAM, and glue logic. To allow for non-coherent GMSK detection of a coherent GMSK signal, the additional hardware circuitry needed are the algebraic mapping and differential decoder. The algebraic mapping is accomplished by a threshold comparator, illustrated in FIG. 8. The differential decoder is accomplished by XORing (601) the logic symbols with a delayed feedback signal (602).

An alternate embodiment for performing hard-decision is to perform soft-decision. One possible method to implement soft-decision is integrate-and-dump. Integrate-and-dump is illustrated in IEEE Transactions on Vehicular Technology, Vol. VT-33, No. 3, August 1984, *Multilevel Decision Method for Band-Limited Digital FM with Limiter-Discriminator Detection* by M. Hirono, T. Miki, and K. Murota.

In summary, the process and apparatus of the present invention provides differential demodulation of a GMSK signal in real-time using a non-coherent receiver. The process synchronizes the receiver in the time and frequency domains to the received signal and demodulates information symbols without the expense and complex hardware required for a coherent receiver.

I claim:

1. A method for recovering information from a differentially encoded gaussian minimal shift keying (GMSK) signal in real-time by a non-coherent receiver, the receiver having at least one stored synchronization sequence and receiving a GMSK signal containing differentially encoded digital information, the method comprising the steps of:
   a) non-coherently detecting the GMSK signal to produce a signal comprising recovered channel symbols; and
   b) differentially decoding the recovered channel symbols to recover the digital information by converting the channel symbols to logical symbols representative of the channel symbols and integrating the logical symbols to recover the digital information.

2. A method for recovering information from a differentially encoded gaussian minimal shift keying (GMSK) signal in real-time by a non-coherent receiver, the receiver having at least one stored synchronization sequence and receiving a signal containing digital information encoded into channel symbols, the method comprising the steps of:
   a) frequency demodulating the received signal to produce a base band signal representative of the channel symbols;
   b) digitizing the base band signal to produce a sampled base band signal;
   c) synchronizing symbol recovery to the base band signal by comparing the base band signal to one of the at least one synchronization sequence;
   d) recovering the channel symbols by comparing the sampled base band signal to a decision threshold;
   e) converting the channel symbols to logical symbols representative of the channel symbols; and
   f) integrating the logical symbols to recover the digital information.

3. A method for recovering information from a differentially encoded gaussian minimal shift keying (GMSK) signal in real-time by a non-coherent receiver, the receiver having at least one stored synchronization sequence and receiving a signal containing digital information encoded into channel symbols, the method comprising the steps of:
   a) demodulating the received signal using a frequency discriminator based frequency modulated receiver to produce a base band signal representative of the channel symbols;
   b) limiting the base band signal to logic levels determined by a predetermined threshold to produce a signal comprising the channel symbols;
   c) sampling the signal comprising the channel symbols to produce a discrete logical channel symbol sequence, the sequence comprising a plurality of logic one values and logic zero values;
   d) converting the plurality of logic zero values to negative one values and the plurality of logic one values to positive one values thus producing an oversampled, translationally mapped sequence;
   e) correlating the oversampled, translationally mapped sequence with one of the plurality of stored synchronization sequences to produce a plurality of correlation values for the oversampled, translationally mapped sequence;
   f) determining at least one peak correlation value of the plurality of correlation values;
   g) determining a median peak correlation value of the at least one peak correlation value and its location in the oversampled, translationally mapped sequence, the location defines a reference point in the oversampled, translationally mapped sequence;
   h) decimating the oversampled, translationally mapped sequence starting at the reference point to produce recovered channel symbols;
   i) converting the channel symbols to logical data symbols representative of the channel symbols; and
   j) differentially decoding the logical data symbols to recover the digital information.

4. A gaussian minimal shift keying (GMSK), non-coherent demodulation receiver apparatus for demodulating a GMSK signal in real-time, the apparatus having at least one stored synchronization sequence and receiving a GMSK signal containing differentially encoded digital information, the apparatus comprising:
   a) non-coherent GMSK signal detection means to produce a signal comprising recovered channel symbols;
   b) threshold comparison means, coupled to the non-coherent GMSK signal detection means, for converting the channel symbols to logical symbols representative of the channel symbols; and
   c) integration means, coupled to the threshold comparison means, to recover the digital information from the logical symbols.

5. A gaussian minimal shift keying (GMSK), non-coherent demodulation receiver apparatus for demodulating a GMSK signal in real-time, the apparatus having at least one stored synchronization sequence and receiving a signal containing digital information encoded into channel symbols, the apparatus comprising:
   a) frequency demodulation means, coupled to the GMSK signal, to produce a base band signal, from the GMSK signal, representative of the channel symbols;
   b) sampling means, coupled to the frequency demodulation means, for digitizing the base band signal to produce a sampled base band signal;
   c) first comparison means, coupled to the sampling means, for comparing the sampled base band signal to one of the at least one synchronization sequences;
   d) decision comparison means, coupled to the first comparison means, for comparing the sampled base band signal to a decision threshold, thereby recovering the channel symbols;

e) threshold comparison means, coupled to the decision comparison means, for comparing the channel symbols to a predetermined threshold, thereby producing logical symbols representative of the channel symbols; and f) integration means, coupled to the threshold comparison means, for integrating the logical symbols to recover the digital information.

* * * * *